(12) United States Patent
Wu et al.

(10) Patent No.: US 8,778,503 B2
(45) Date of Patent: Jul. 15, 2014

(54) POLY(AMIC ACID AMIDEIMIDE) INTERMEDIATE TRANSFER MEMBERS

(75) Inventors: Jin Wu, Pittsford, NY (US); Jonathan H. Herko, Walworth, NY (US); Francisco J. Lopez, Rochester, NY (US); Kyle B. Tallman, Farmington, NY (US); Michael S. Roetker, Webster, NY (US); David W. Martin, Walworth, NY (US); Brian P. Gilmartin, Williamsville, NY (US)

(73) Assignee: Xerox Corporation, Norwalk, CT (US)

( * ) Notice: Subject to any disclaimer, the term of this patent is extended or adjusted under 35 U.S.C. 154(b) by 417 days.

(21) Appl. No.: 13/074,592

(22) Filed: Mar. 29, 2011

(65) Prior Publication Data

US 2012/0248379 A1  Oct. 4, 2012

(51) Int. Cl.
*B32B 27/28* (2006.01)
*C08K 5/17* (2006.01)

(52) U.S. Cl.
USPC ........ 428/473.5; 252/511; 399/302; 428/421; 428/422; 428/447; 524/145

(58) Field of Classification Search
USPC ........ 252/511; 399/302; 428/421, 422, 473.5, 428/447; 524/145
See application file for complete search history.

(56) References Cited

U.S. PATENT DOCUMENTS

| | | | |
|---|---|---|---|
| 3,691,136 A * | 9/1972 | Serres et al. | 524/127 |
| 5,487,707 A | 1/1996 | Sharf et al. | |
| 6,139,784 A | 10/2000 | Oshima et al. | |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,602,156 B2 | 8/2003 | Schlueter, Jr. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 2002/0054971 A1* | 5/2002 | Shimojo et al. | 428/36.9 |
| 2006/0009555 A1* | 1/2006 | Haubennestel et al. | 524/261 |
| 2008/0020313 A1* | 1/2008 | Wu et al. | 430/69 |
| 2008/0240802 A1* | 10/2008 | Nakura | 399/313 |
| 2011/0052840 A1* | 3/2011 | Wu | 428/32.5 |
| 2012/0183783 A1* | 7/2012 | Wu et al. | 428/422 |

FOREIGN PATENT DOCUMENTS

JP  10226028 A * 8/1998 ............. B32B 27/34

OTHER PUBLICATIONS

Machine translation of JP 10226028 (2012).*

* cited by examiner

*Primary Examiner* — Callie Shosho
*Assistant Examiner* — John Freeman
(74) *Attorney, Agent, or Firm* — Eugene O. Palazzo

(57) ABSTRACT

An intermediate transfer member includes a poly(amic acid amideimide), or a mixture of a poly(amic acid amideimide), a phosphate ester, an optional polysiloxane, and an optional conductive filler component.

19 Claims, 1 Drawing Sheet

POLY(AMIC ACID AMIDEIMIDE) INTERMEDIATE TRANSFER MEMBERS

This disclosure is generally directed to an intermediate transfer member that includes a poly(amic acid amideimide) polymer, or an intermediate transfer member that comprises a mixture of a poly(amic acid amideimide) polymer, a phosphate ester, an optional siloxane polymer, and an optional conductive component.

BACKGROUND

Intermediate transfer members, such as intermediate transfer belts selected for transferring a developed image in xerographic systems, are known. For example, there are known intermediate transfer belts that contain polyphenylsulfones or thermosetting polyimides. The polyphenylsulfones have a tendency to degrade after a number of xerographic printing cycles, such as from about 20 to about 30 kiloprints, while polyimides can be costly, especially because such imides are usually subjected to curing by heating for extended time periods.

Also known are intermediate transfer members that include materials with characteristics that cause these members to become brittle resulting in inadequate acceptance of the developed image, and subsequent partial transfer of developed xerographic images to a substrate like paper. Other disadvantages that may be associated with intermediate transfer members relate to their inadequate mechanical strength, poor breakage characteristics, insufficient extended gloss properties, and the unacceptable complete transfer of, for example, from about 80 to about 90 percent of xerographic developed images to a substrate like paper, unstable and consistent resistivity, and degradation in the developed image being transferred from the member.

Intermediate transfer members that enable acceptable registration of the final color toner image in xerographic color systems using synchronous development of one or more component colors, and using one or more transfer stations are known. However, a disadvantage of using an intermediate transfer member, in color systems, is that a plurality of developed toner transfer operations is utilized thus sometimes causing charge exchange between the toner particles and the transfer member, which ultimately can result in less than complete toner transfer. This can result in low resolution images on the image receiving substrate like paper, and image deterioration. When the image is in color, the image can additionally suffer from color shifting and color deterioration.

There is a need for intermediate transfer members that substantially avoid or minimize the disadvantages of a number of known intermediate transfer members.

Further, there is a need for intermediate transfer member materials with minimal brittleness, and excellent break strengths.

There is also a need for intermediate transfer members that can be economically and efficiently prepared.

Additionally, there is a need for intermediate transfer members that possess excellent transfer capabilities, and have minimal and acceptable brittleness characteristics.

Another need relates to intermediate transfer members that have excellent conductivity or resistivity, and that possess acceptable humidity insensitivity characteristics permitting developed images with minimal resolution issues.

Also, there is a need for intermediate transfer member materials that have acceptable gloss characteristics for extended time periods.

Moreover, there is a need for intermediate transfer members with excellent wear and improved abrasion resistance.

These and other needs are achievable in embodiments with the intermediate transfer members, and components thereof disclosed herein.

SUMMARY

Disclosed is an intermediate transfer member comprising a poly(amic acid amideimide).

There is illustrated herein an intermediate transfer member comprising a polymer layer comprising a mixture of a poly(amic acid-co-amideimide) copolymer, a phosphate ester, a polydialkylsiloxane copolymer, and a conductive filler component, and wherein the poly(amic acid-co-amideimide) copolymer is encompassed by the following formulas/structures

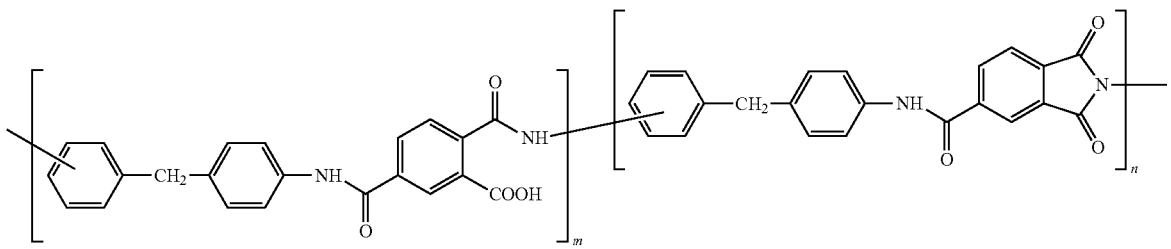

where m and n independently represent the number of repeating segments, where m is a number of from about 100 to about 1,000, and n is a number of from about 100 to about 1,000.

There is illustrated herein an intermediate transfer member comprising a mixture of a poly(amic acid-co-amideimide) copolymer, a phosphate ester, a polydialkylsiloxane, and a conductive carbon black component, which member possesses a break strength of from about 74 to about 98 Mega Pascals, and wherein the poly(amic acid-co-amideimide) copolymer is encompassed by the following formulas/structures

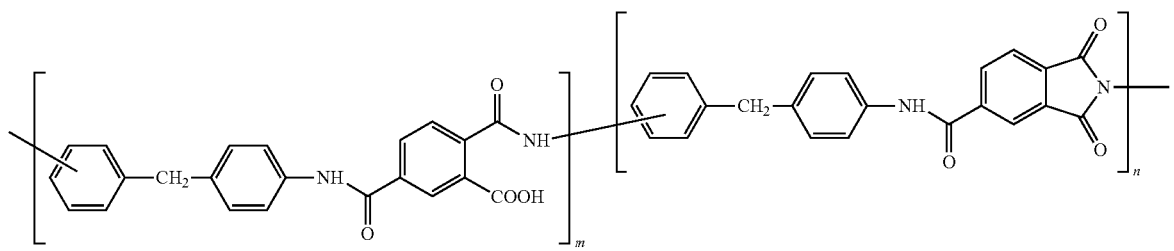

wherein m is a number of from about 200 to about 400, and n is a number of from about 200 to about 400.

FIGURES

The following Figures are provided to further illustrate the intermediate transfer members disclosed herein.

EMBODIMENTS

There is provided herein an intermediate transfer member comprising an optional supporting substrate, and thereover a polymer layer comprising a mixture of a poly(amic acid amideimide) polymer, a conductive component or filler like carbon black, a phosphate ester, and a siloxane polymer.

Figure 1:
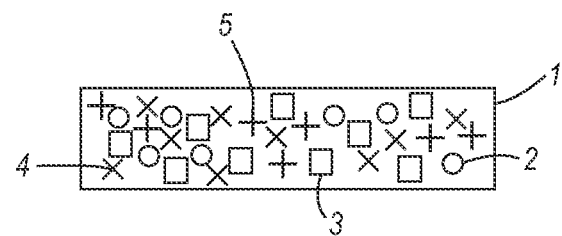
FIG. 1 illustrates an exemplary embodiment of a one-layer intermediate transfer member of the present disclosure.

In FIG. 1 there is illustrated a one-layer intermediate transfer member comprising a polymer layer 1, comprising poly(amic acid amideimides) 2, or a mixture of poly(amic acid amideimides) 2, conductive components or fillers 3, optional phosphate esters 4, and optional siloxane polymers 5.

Figure 2:
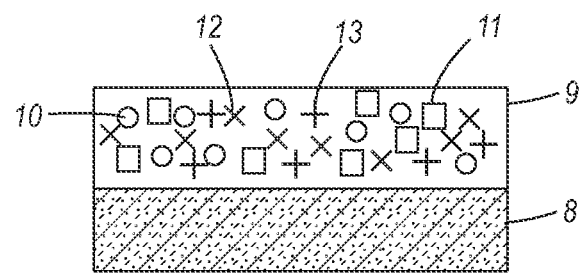
FIG. 2 illustrates an exemplary embodiment of a two-layer intermediate transfer member of the present disclosure.

In FIG. 2 there is illustrated a two-layer intermediate transfer member comprising a supporting substrate 8, a polymer layer 9, comprising a mixture of poly(amic acid amideimides) 10, fillers 11, phosphate esters 12, and siloxane polymers 13.

Figure 3:
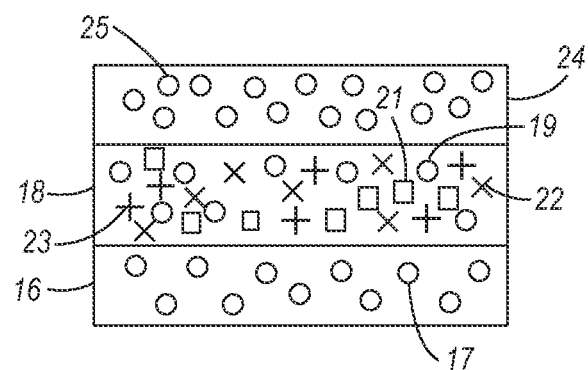
FIG. 3 illustrates an exemplary embodiment of a three-layer intermediate transfer member of the present disclosure.

In FIG. 3 there is illustrated a three-layer intermediate transfer member comprising a supporting substrate 16, comprising fillers 17, dispersed therein, and thereover a polymer layer 18, comprising a mixture of poly(amic acid amideimides) 19, fillers 21, phosphate esters 22, and siloxane polymers 23, and thereover a release layer 24, comprising release components 25.

There is disclosed an intermediate transfer member that generally comprises a poly(amic acid amideimide) polymer layer, or comprises a blend or mixture of the poly(amic acid amideimide) polymer, such as a poly(amic acid-co-amideimide) copolymer, and a phosphate ester, a polysiloxane polymer, and optionally a conductive component or filler like carbon black. The polymer layer or polymer layer mixture provides an intermediate transfer member that exhibits improved properties compared to a number of conventional intermediate transfer members formed using polyimides, but at substantially reduced costs, such as about $32 per pound for the poly(amic acid amideimide) polymer compared to about $200 per pound for known polyimides; and with excellent release characteristics, smooth high quality surfaces, and improved mechanical properties.

The intermediate transfer members comprising the poly(amic acid amideimide) polymer, or containing the poly(amic acid amideimide) polymer mixture disclosed herein exhibit excellent mechanical strength of, for example, from about 1,000 to about 2,000 xerographic imaging kilocycles, while permitting the rapid and complete transfer, from about 90 to about 98, or from about 95 to about 100 percent transfer of the xerographic developed image, and a break strength of from about 74 to about 98, from about 75 to about 97, from about 75 to about 95, from about 74 to about 96, from about 80 to about 90, or from about 85 to about 95 Mega Pascals (MPa).

Also, the disclosed intermediate transfer members have a Young's modulus of, for example, from about 3,000 to about 5,000, from about 3,500 to about 5,000, or from about 3,700 to about 4,000 MPa; a gloss value of from about 100 to about 175, or from about 100 to about 120; a glass transition temperature ($T_g$) of from about 200° C. to about 400° C. or from about 250° C. to about 375° C.; and a CTE (coefficient of thermal expansion) of from about 20 to about 70 ppm/° K, or from about 35 to about 60 ppm/° K; and an excellent resistivity as measured with a known High Resistivity Meter of, for example, from about $10^8$ to about $10^{13}$ ohm/square, from about $10^9$ to about $10^{12}$ ohm/square, or from about $10^{10}$ to about $10^{11}$ ohm/square.

The intermediate transfer members of the present disclosure can be provided in any of a variety of configurations, such as a one-layer configuration, or in a multi-layer configuration including, for example, a supporting substrate and/or a release layer. The final intermediate transfer member may be in the form of an endless flexible belt, a web, a flexible drum or roller, a rigid roller or cylinder, a sheet, a drelt (a cross between a drum and a belt), seamless belt, and the like.

Poly(Amic Acid Amideimide) Polymers

Various suitable poly(amic acid amideimide) polymers can be selected for the intermediate transfer members disclosed herein, inclusive of poly(amic acid amideimide) copolymers, mixtures of two or more different poly(amic acid amideimide) polymers, and the like.

Examples of poly(amic acid amideimide) polymers selected for the disclosed intermediate transfer members are represented by the following formulas/structures

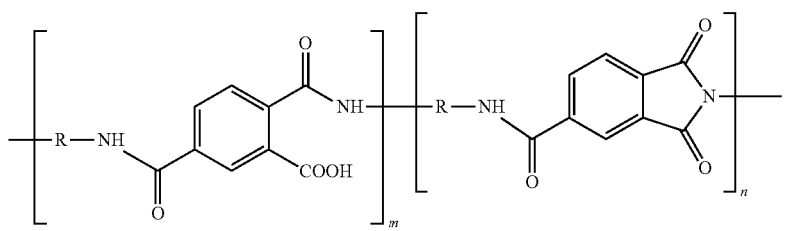

where m and n independently represent the respective number of repeating segments in the polymer chain, and can be from about 20 to about 1,000, from about 75 to about 900, from about 275 to about 500, from about 100 to about 1,000, from about 100 to about 700, from about 150 to about 500, from about 325 to about 675, from about 200 to about 400, from about 200 to about 600, or fractions thereof, and where m and n can be dissimilar values from each other; each R is independently an aryl containing, for example, from about 6 to about 36 carbon atoms, from about 6 to about 24 carbon atoms, from about 6 to about 18 carbon atoms, from about 12 to about 24 carbon atoms, or from about 6 to about 12 carbon atoms.

Aryl examples for the poly(amic acid amideimide) polymers are phenyl, naphthyl, anthryl, and those aryls as represented by the following formulas/structures

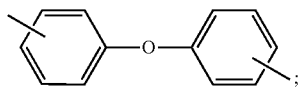

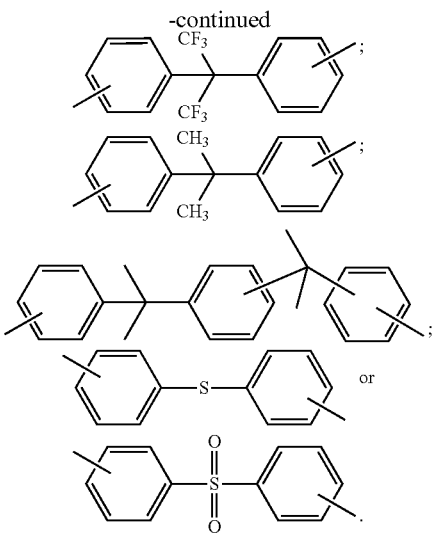

Specific examples of poly(amic acid amideimide) polymers include poly(amic acid-co-amideimide) copolymers as represented by the following formulas/structures

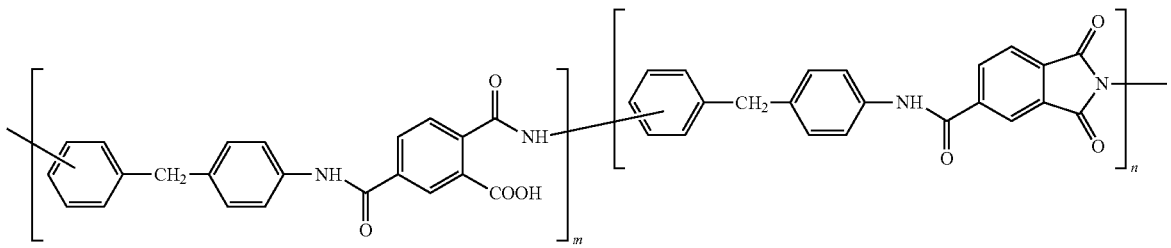

-continued

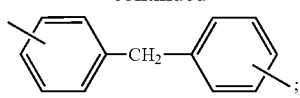

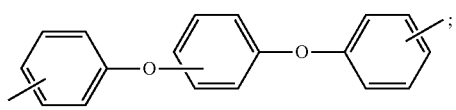

where m and n independently represent the respective number of repeating segments in the polymer chain, and can be from about 20 to about 1,000, from about 100 to about 1,000, from about 75 to about 900, from about 100 to about 700, from about 200 to about 600, from about 200 to about 400, and from about 275 to about 500, or fractions thereof, and where m and n can be dissimilar values from each other.

Specific commercially available examples of the poly (amic acid amideimide) polymers include TORLON® AI-10, AI-10LM, 4000T-LV, 4000T-MV, 4000T-HV or 4000TF, and the like, all available from Solvay Chemical Company.

The number average molecular weight of the poly(amic acid amideimide) polymers selected for the disclosed intermediate transfer members in embodiments can be, for example, from about 2,000 to about 100,000, from about 5,000 to about 80,000, or from about 10,000 to about 50,000, and where the weight average molecular weight can be, for example, from about 4,000 to about 200,000, from about 10,000 to about 160,000, or from about 20,000 to about 100,000. The number average and weight molecular weights are determined by known methods, such as GPC analysis.

The poly(amic acid amideimide) polymers as illustrated herein can be included in the intermediate transfer member mixture in various effective suitable amounts, such as in an amount of from about 70 to about 97 weight percent, from about 70 to about 95 weight percent, from about 75 to about 95 weight percent, or from about 80 to about 90 weight percent, based on the weight of the polymer layer. Also, the poly(amic acid amideimide) polymer can comprise substantially the entire intermediate transfer member where the polymer is present, for example, in an amount of from about 95 to about 100 percent, or about 100 percent, and where the intermediate transfer members are free of the ingredients or components of a phosphate ester, a polysiloxane polymer, and a conductive filler.

The poly(amic acid amideimide) polymers, such as the poly(amic acid-co-amideimide) copolymers, available from Solvay Chemical Company, are believed to be a reactive poly(amic acid-co-amideimide) copolymer comprised of a trimellitic, aromatic amide, and aromatic imide moieties. For the poly(amic acid-co-amideimide) copolymers, available as TORLON® AI-10 from Solvay Chemical Company, approximately 50 percent of the copolymer is in the un-imidized or amic acid form, and then when heated to from about 90° C. to about 150° C., the copolymer undergoes cyclizations to the imide form.

Without being limited by theory, three processes are believed to occur during curing or heating in forming the poly(amic acid amideimide) polymers, it is believed, removal of the solvent, imidization, and chain extension or weight average molecular weight increase. For example, by heating the polymer at from about 93° C. to about 150° C., the imidization reaction occurs through cyclization of the ortho carboxylic acid with the amide to form the five-membered imide ring with the evolution of water. Continued heating at from about 150° C. to about 232° C. removes most, such as from about 95 to about 99 percent, of the solvent with some chain extension occurring. Also, peak temperatures of from about 249° C. to about 320° C. can be selected to remove any final traces of solvent and to permit selected molecular weights and excellent intermediate transfer member properties.

Optional Phosphate Esters

The intermediate transfer members of the present disclosure can also include an optional phosphate ester that is blended or mixed with the poly(amic acid amideimide) polymer, and the other optional components illustrated herein, such as a polysiloxane, and conductive filler. As the phosphate esters, which can also function to assist in release of the poly(amic acid amideimide)polymer containing mixture from a substrate like stainless steel, any suitable phosphate ester, or mixture of two, three, or more different phosphate esters can be used.

Examples of suitable phosphate esters that can be mixed with the poly(amic acid amideimide) include a number of known phosphate esters, and more specifically, where the phosphate ester is a phosphate ester of alkyl alcohol alkoxylate such as alkyl alcohol ethoxylate, alkyl phenol alkoxylate such as alkyl phenol ethoxylate, alkyl polyethoxyethanol such as alkyl polyalkoxyethanol, alkylphenoxy polyalkoxyethanol such as alkylphenoxy polyethoxyethanol, mixtures thereof, and the corresponding alkoxy esters wherein alkyl and alkoxy contain, for example, from 1 to about 36 carbon atoms, from 1 to about 18 carbon atoms, from 1 to about 12 carbon atoms, or from 1 to about 6 carbon atoms, optionally mixtures thereof, and the like. Various suitable phosphate esters are available from STEPAN Company, Northfield, Ill. In embodiments, the number average molecular weight of the phosphate ester is, for example, from about 200 to about 2,000, from about 500 to about 1,000, or from about 300 to about 800; and the weight average molecular weight of the phosphate ester is, for example, from about 250 to about 8,000, from about 1,000 to about 5,000, or from about 400 to about 2,000.

Phosphate esters of alkyl alcohol ethoxylate examples that can be selected for adding to or mixing with the poly(amic acid amideimide) include POLYSTEP® P-11, P-12 and P-13 (tridecyl alcohol ethoxylate phosphate, available from STEPAN Company, Northfield, Ill.) with an average mole number of ethoxy (EO) groups of about 3, 6 and 12, respectively, where the average mole number of ethoxy groups can be determined by known methods, such as NMR. With a single phosphate ester like POLYSTEP® P-11 that has three ethoxy (EO) groups [—$CH_2CH_2O$—$CH_2CH_2O$—$CH_2CH_2O$—] in its structure, the higher the mole number of EO, the higher the molecular weight of the phosphate ester. Specific examples of the aforementioned phosphate esters present in the amounts illustrated herein are an alkyl alcohol ethoxylates, with from 1 to about 25 carbon atoms, like trioctyl alcohol ethoxylate phosphate, trihexyl alcohol ethoxylate phosphate, triheptyl alcohol ethoxylate phosphate, or tripentyl alcohol ethoxylate phosphate.

Examples of phosphate esters of alkyl phenol ethoxylates that can be mixed with the poly(amic acid amideimide) include POLYSTEP® P-31, P-32, P-33, P-34 and P-35 (nonylphenol ethoxylate phosphate, available from STEPAN Company, Northfield, Ill.) with an average mole number of ethoxy (EO) groups of about 4, 6, 8, 10 and 12, respectively. Other examples of phosphate esters of alkyl phenol ethoxylates include octylphenol ethoxylate phosphate, hexylphenol ethoxylate phosphate, decylphenol ethoxylate phosphate, or heptylphenol ethoxylate phosphate.

Phosphate esters of alkyl polyethoxyethanol that can be mixed with the poly(amic acid amideimide) include STEPFAC™ 8180, 8181 and 8182 (polyethylene glycol tridecyl ether phosphate, available from STEPAN Company, Northfield, Ill.) with an average mole number of ethoxy (EO) groups of about 3, 6 and 12, respectively. Other examples of phosphate esters of alkyl polyethoxyethanol include polyethylene glycol trioctyl ether phosphate, polyethylene glycol triheptyl ether phosphate, polyethylene glycol trihexyl ether phosphate, or polyethylene glycol tripentyl ether phosphate.

Alkylphenoxy polyethoxyethanol phosphate esters that can be included together with the poly(amic acid amideimide) containing mixture include STEPFAC™ 8170, 8171, 8172, 8173, 8175 (nonylphenol ethoxylate phosphate, available from STEPAN Company, Northfield, Ill.) with an average mole number of ethoxy (EO) groups of about 10, 6, 4, 8 and 12, respectively. Phosphate esters of alkylphenoxy polyethoxyethanol include octylphenol ethoxylate phosphate, decylphenol ethoxylate phosphate, heptylphenol ethoxylate phosphate, or hexylphenol ethoxylate phosphate.

Various amounts of phosphate esters can be selected for the intermediate transfer members disclosed herein, such as for example, from about 0.1 to about 10 weight percent, from about 0.5 to about 10 weight percent, from about 0.5 to about 5 weight percent, from about 1 to about 3 weight percent, from about 0.2 to about 3 weight percent, from about 0.5 to about 5 weight percent, or from about 1 to about 4 weight percent, based on the total weight of the polymer layer.

Optional Polysiloxane Polymers

Examples of polysiloxane polymers that can be mixed with the poly(amic acid amideimide) are polyether modified polydimethylsiloxanes, commercially available from BYK Chemical Chemical as BYK® 333, BYK® 330 (about 51 weight percent in methoxypropylacetate); BYK® 344 (about 52.3 weight percent in xylene/isobutanol=80/20); BYK®-SILCLEAN 3710 and BYK®-SILCLEAN 3710 3720 (about 25 weight percent in methoxypropanol); polyester modified polydimethylsiloxanes, commercially available from BYK Chemical as BYK® 310 (about 25 weight percent in xylene) and BYK® 370 (about 25 weight percent in xylene/alkylbenzenes/cyclohexanone/monophenylglycol=75/11/7/7); polyacrylate modified polydimethylsiloxanes, commercially available from BYK Chemical as BYK®-SILCLEAN 3700 (about 25 weight percent in methoxypropylacetate); and polyester polyether modified polydimethylsiloxanes, commercially available from BYK Chemical as BYK® 375 (about 25 weight percent in di-propylene glycol monomethyl ether).

The polysiloxane polymer, or copolymers thereof can be present in various effective amounts, such as from about 0.01 to about 1 weight percent, from about 0.05 to about 1, from about 0.05 to about 0.5 weight percent, and from about 0.1 to about 0.3 weight percent based on the weight of the polymer layer mixture.

Optional Fillers

Optionally, the intermediate transfer member may contain one or more fillers in the supporting substrate, when present, and in the poly(amic acid amideimide) polymer mixtures. For example, conductive fillers can be included to alter and adjust the conductivity of the disclosed intermediate transfer members. Where the intermediate transfer member is a one layer structure, the conductive filler can be included in the polymer mixture. However, where the intermediate transfer member is a multi-layer structure, the conductive filler can be included in one or more layers of the member, such as in the supporting substrate and/or the polymer mixture layer coated thereon.

Any suitable filler can be used that provides the desired results. For example, suitable fillers include carbon blacks, metal oxides, polyanilines, other known suitable fillers, and mixtures of fillers. When present, the filler can be included in the mixture in an amount of from about 1 to about 60 weight percent, from about 1 to about 30 weight percent, from about 3 to about 40 weight percent, from about 10 to about 30 percent, from about 4 to about 30 weight percent, or from about 5 to about 20 weight percent of the total weight of the components in the layer in which the filler is included.

Examples of carbon black fillers that can be selected for the intermediate transfer member include special black 4 (B.E.T. surface area=180 m$^2$/g, DBP absorption=1.8 ml/g, primary particle diameter=25 nanometers), available from Evonik-Degussa; special black 5 (B.E.T. surface area=240 m$^2$/g, DBP absorption=1.41 ml/g, primary particle diameter=20 nanometers), color black FW1 (BET. surface area=320 m$^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), and color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); and Channel carbon blacks available from Evonik-Degussa. Other known suitable carbon blacks not specifically disclosed herein may be selected as the filler or conductive component for the intermediate transfer member disclosed herein.

Examples of polyaniline fillers that can be selected for incorporation into the poly(amic acid amideimide) mixture are PANIPOL™ F, commercially available from Panipol Oy, Finland, and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer member poly(amic acid amideimide) mixture include, for example, tin oxide, antimony doped tin oxide, indium oxide, indium tin oxide, zinc oxide, titanium oxide, and the like.

Optional Polymers

In embodiments of the present disclosure, the intermediate transfer member can further include an additional polymer in the poly(amic acid amideimide), or in the poly(amic acid amideimide) polymer mixture that also contains phosphate ester, the polysiloxane polymer, and the optional conductive filler components.

Examples of suitable additional polymers include a polyimide, polyamideimide, a polycarbonate, a polyphenylene sulfide, a polyamide, a polysulfone, a polyetherimide, a polyester, a polyvinylidene fluoride, a polyethylene-co-polytetrafluoroethylene, poly(amic acid amideimide) polymer, and the like, and mixtures thereof.

When an additional polymer is selected, it can be included in the poly(amic acid amideimide) mixture in any desirable and effective amounts, such as in an amount of from about 1 to about 75 weight percent, from about 2 to about 45, or from about 3 to about 15 weight percent, based on a total weight of the polymer layer.

Supporting Substrate

If desired, a supporting substrate, in the configuration of a layer, can be included in the disclosed intermediate transfer members, such as below the poly(amic acid amideimide) or below the poly(amic acid amideimide) mixture containing polymer layer. The supporting substrate can provide increased rigidity or strength to the intermediate transfer member. When a supporting substrate is used, a metal or glass substrate used in forming the intermediate member can be replaced by the supporting substrate material, or the supporting substrate can first be formed on the metal or glass substrate followed by forming the poly(amic acid amideimide) containing polymer layer on the supporting substrate, and prior to removing the completed structure from the metal or glass substrate.

The poly(amic acid amideimide) containing mixture can be coated on any suitable supporting substrate material to form a dual layer intermediate transfer member. Exemplary supporting substrate materials include polyimides, polyamideimides, polyetherimides, and the like, and mixtures thereof.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, thermosetting polyimides and the like. The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000, or from about 10,000 to about 100,000, and a weight average molecular weight of from about 50,000 to about 5,000,000, or from about 100,000 to about 1,000,000.

Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15 [weight percent], $T_g$=255° C., and $M_w$=8,000), HR-13NX (30 weight percent solution in N-methylpyrrolidone/xylene=67/33 [weight percent], $T_g$=280° C., and $M_w$=10,000), HR-15ET (25 weight percent solution in ethanol/toluene=50/50 [weight percent], $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga., where $M_w$ represents the weight average molecular weight Examples of specific polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 (T 217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Once formed, the supporting substrate can have any desired and suitable thickness. For example, the supporting substrate can have a thickness of from about 10 to about 300 microns, from about 50 to about 150 microns, and from about 75 to about 125 microns.

Optional Release Layer

In embodiments, the disclosed intermediate transfer members may further include an outer release layer, usually present on top of the poly(amic acid amideimide) in the form of a layer, or present on the mixture of the poly(amic acid amideimide), the phosphate ester, the polysiloxane, and the filler. The release layer can be included, for example, to alter the surface characteristics of the disclosed intermediate transfer members to allow easier release of toner material from the members.

Exemplary materials or components that are suitable for use in a release layer include TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E46®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers. Also, the phosphate esters disclosed herein can assist in release.

The release layer may be deposited on the poly(amic acid amideimide) or the poly(amic acid amideimide) containing mixture by any known coating processes. Known methods for forming the outer release layer include dipping, spraying, such as by multiple spray applications of very thin films, casting, flow-coating, web-coating, roll-coating, extrusion, molding, or the like.

Intermediate Transfer Member Formation

The poly(amic acid amideimide) or the poly(amic acid amideimide) containing mixture illustrated herein can be formulated into an intermediate transfer member by any suitable method. For example, with known milling processes, there can be prepared poly(amic acid amideimide) intermediate transfer member, or there can be prepared uniform dispersions of the intermediate transfer member mixture that is then coated on individual metal substrates, such as a stainless steel substrate or the like, using known draw bar coating methods. The resulting individual film or films can be dried at high temperatures, such as by heating at from about 100° C. to about 400° C., or from about 160° C. to about 300° C., for a suitable period of time, such as from about 20 to about 180 minutes, or from about 40 to about 120 minutes, while remaining on the substrates. After drying and cooling to room temperature, about 23° C. to about 25° C., the films resulting can be removed from the substrates by known processes, such as by hand peeling or such films can be self-releasing with no outside assistance. The resultant films can have a thickness of, for example, from about 15 to about 150 microns, from about 20 to about 100 microns, or from about 25 to about 75 microns.

As metal substrates selected for the deposition of the poly(amic acid amideimide) containing mixture, there can be selected stainless steel, aluminum, nickel, copper, and their alloys, or other conventional materials. Other suitable substrates that can be used include glass plates, and the like.

Examples of solvents selected for formation of the poly(amic acid amideimide) containing mixture, which solvents can be selected in an amount of from about 60 to about 95 weight percent, or from about 70 to about 90 weight percent of the total coating polymer mixture weight include alkylene halides, such as methylene chloride, tetrahydrofuran, toluene, monochlorobenzene, N-methyl-2-pyrrolidone, N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, mixtures thereof, and the like. Diluents can be mixed with the solvents of the poly(amic acid amideimide) copolymer solutions. Examples of diluents added to the solvents in amounts, for example, of from about 1 to about 25 weight percent, or from 1 to about 10 weight percent based on the weight of the solvent and the diluent are known diluents like aromatic hydrocarbons, ethyl acetate, acetone, cyclohexanone, and acetanilide.

The disclosed intermediate transfer members are, in embodiments, seamless, that is, with an absence of any seams or visible joints in the members. Moreover, the intermediate transfer members disclosed herein may be weldable. That is, opposite ends of the formed film can be welded together, such as by ultrasonic welding, to produce a seam.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids unless otherwise indicated. The viscosity values were determined with a viscometer.

COMPARATIVE EXAMPLE 1

A coating composition mixture comprising the polyphenylsulfone, RADEL® NT-5000 as obtained from Solvay Advanced Polymers, LLC, Alpharetta, Ga., and special carbon black 4 (B.E.T. surface area=180 $m^2$/g, DBP absorption=1.8 ml/g, primary particle diameter=25 nanometers) as obtained from DeGussa Chemicals, with a weight ratio of 83/17 in N-methylpyrrolidone (about 30 weight percent solids) was prepared with an Attritor. Subsequently, about 0.05 weight percent of the polysiloxane copolymer, BYK® 333, obtained from BYK Chemical Company, was added to the Attritor containing the above prepared coating composition.

The resulting dispersion with about 20 weight percent solids, and with an about 1,600 cps viscosity, was flow coated on a stainless steel belt substrate of a thickness of 0.5 millimeter, followed by drying at 65° C. for 20 minutes, 135° C. for 30 minutes, 200° C. for 30 minutes, and 250° C. for 30 minutes. There resulted, after the obtained dried coatings were released from the stainless steel substrate, a seamless 100 micron thick intermediate transfer member as determined by visual observation, and by use of a microscope, and where the weight ratio of the polyphenylsulfone/carbon black/polysiloxane was 82.95/17/0.05 based on the above initial mixture feed amounts.

EXAMPLE I

Coating composition mixtures comprising the poly(amic acid-co-amideimide) copolymer, TORLON® AI-10, where m is of a value of 300, n is of a value of 300, and R is $C_6H_4$—$CH_2$—$C_6H_4$ in the general formulas/structures illustrated herein, and special carbon black 4 (B.E.T. surface area=180 $m^2$/g, DBP absorption=1.8 ml/g, primary particle diameter=25 nanometers), as obtained from DeGussa Chemicals, with a weight ratio of 83/17 in N-methylpyrrolidone (about 30 weight percent solids) was prepared with an Attritor. Subsequently, about 0.05 weight percent of the polysiloxane copolymer, BYK® 333, obtained from BYK Chemical Company, and the phosphate ester, STEPFAC® 8171 (nonylphenol ethoxylate phosphate, available from STEPAN Company, Northfield, Ill., with an average mole number of ethoxy (EO) of about 6), about 2 weight percent, was added to the Attritor containing the above prepared coating composition.

The resulting dispersion, about 30 weight percent solids and with an about 1,200 cps viscosity, was flow coated on a stainless steel belt substrate of a thickness of 0.5 millimeter, followed by drying at (1) 65° C. for 20 minutes, 135° C. for 30 minutes, and 200° C. for 30 minutes, or at (2) 65° C. for 20 minutes, 135° C. for 30 minutes, 200° C. for 30 minutes, and 250° C. to 10 minutes. There resulted after the obtained dried coatings self released and without any outside assistance from the stainless steel substrates, two seamless 100 micron thick intermediate transfer members as determined by visual observation and by use of a microscope, and where for the first member (1), Example I(A), the weight ratio of the poly(amic acid-co-amideimide)/carbon black/polysiloxane/phosphate ester was 80.95/17/0.05/2, and where for the second member (2), Example I(B), the weight ratio of the poly(amic acid-co-amideimide)/carbon black/polysiloxane/phosphate ester was 80.95/17/0.05/2 based on the above initial mixture feed amounts.

EXAMPLE II

An intermediate transfer member is prepared by repeating the process of Example I except there is selected as the poly (amic acid-co-amideimide) copolymer TORLON® AI-10LM, as the phosphate ester STEPFAC® 8170 (nonylphenol ethoxylate phosphate, available from STEPAN Company, Northfield, Ill. with an average mole number of ethoxy (EO) of about 10), and as the polysiloxane BYK® 310 obtained from BYK Chemical Company.

EXAMPLE III

A coating composition mixture comprising the polyamic acid of biphenyl tetracarboxylic dianhydride/4,4'-oxydianiline (U-VARNISH S™ as obtained from UBE America Inc., New York, N.Y.), and special carbon black 4 (B.E.T. surface area=180 m²/g, DBP absorption=1.8 ml/g, primary particle diameter=25 nanometers), as obtained from DeGussa Chemicals, with a weight ratio of 83/17 in N-methylpyrrolidone (about 30 weight percent solids) was prepared with an Attritor. Subsequently, a small amount, about 0.05 weight percent, of the polysiloxane copolymer, BYK® 333, obtained from BYK Chemical Company, and the phosphate ester, STEPFAC® 8171 (nonylphenol ethoxylate phosphate, available from STEPAN Company, Northfield, Ill. with an average mole number of ethoxy (EO) of about 6), about 2 weight percent, was added to the Attritor containing the above prepared coating composition.

The resulting dispersion, with about 17 weight percent solids and with an about 1,400 cps viscosity, was flow coated on a stainless steel belt substrate of a thickness of 0.5 millimeter, following by drying at 65° C. for 20 minutes, 135° C. for 30 minutes, 200° C. for 30 minutes, 250° C. for 30 minutes, and 320° C. for 60 minutes.

There resulted, after the obtained dried coatings self released without any outside assistance from the stainless steel substrate, a seamless 100 micron thick intermediate transfer member as determined by visual observation and by use of a microscope, and where the weight ratio of the poly (amic acid)/carbon black/polysiloxane/phosphate ester was 80.95/1710.0512 based on the above initial mixture feed amounts.

Measurements

The above four intermediate transfer members (ITM) of Comparative Example 1, Example I(A), Example I(B), and Example III, were measured for Young's modulus, break strength, coefficient of thermal expansion (CTE), and triroller cycle. The measurement results are provided in Table 1.

TABLE 1

| ITM | Young's Modulus (MPa) | Break Strength (MPa) | CTE (ppm/° K) | Triroller Cycle |
|---|---|---|---|---|
| Comparative Example 1 | 6,000 | 163 | 47.5 | 1,600,000 |
| Example I(A) | 3,700 | 74 | 60 | 1,600,000 |
| Example I(B) | 3,900 | 96 | 55 | 1,600,000 |
| Example III | 3,700 | 76 | 100 | 200,000 |

The Young's modulus and break strength were measured by following the known ASTM D882-97 process.

Also, samples of each intermediate transfer member (0.5 inch×12 inch) of Comparative Example 1, Example I(A), Example I(B), and Example III were placed at different times in Instron Tensile Tester measurement apparatus, and then the samples were elongated at a constant pull rate until breaking. During this time, there was recorded the resulting load versus the sample elongation. The break strength modulus was calculated by taking any point tangential to the initial linear portion of this curve and dividing the tensile stress by the corresponding strain. The tensile stress was calculated by the load divided by the average cross sectional area of each of the test samples. The break strength was recorded as the tensile stress when the sample broke or came apart.

The CTE was measured using a Thermo-mechanical Analyzer (TMA). Four samples of the Comparative Example 1, Example I(A), Example I(B), and Example III, intermediate transfer members were cut using a razor blade and metal die to 4 millimeter wide piece which was then mounted between the TMA clamp using a 8 millimeter spacing. The samples were preloaded to a force of 0.05 Newtons. Data was analyzed from the $2^{nd}$ heat cycle. The CTE values were obtained as a linear fit using the above data between the temperature points of interest of from about −20° C. to about 50° C. region using the TMA software.

The triroller test was used to evaluate the flexural strength of the above prepared intermediate transfer members (ITM). Four samples of the above Comparative Example 1, Example I(A), Example I(B), and Example III, intermediate transfer members were cut into 11 inch×5 inch pieces with both ends clamped onto an in house triroller fixture with a force load of 1 kilogram. The triroller was allowed to rotate until the samples broke, and the triroller cycle number was recorded as an indication of the flexural strength.

The flexural strength, as evaluated by the in house triroller test, of the disclosed poly(amic acid-co-amideimide) intermediate transfer members of Examples I(A) and I(B) were the same as that of the controlled polyamic acid intermediate transfer member of Comparative Example 1, however, the Example I(A) member was about 50 percent less costly to prepare versus the Comparative Example 1 member. The Example I(A), Example I(B), and Example III members were superior in some properties, such as Young modulus, as compared to the polyphenylsulfone intermediate transfer member of Comparative Example 1.

The Young's modulus and break strength of the Example I(A) intermediate transfer member was measured to be about 3,700 MPa (Mega Pascal) and 74 MPa respectively. The Young's modulus and break strength of the Example I(B) intermediate transfer member was measured to be about 3,900 MPa and 96 MPa respectively. The Young's modulus and break strength of the Example III intermediate transfer member was measured to be about 3,700 MPa and 76 MPa respectively.

The above prepared intermediate transfer members of Example I(A), Example I(B), and Example III may be deposited on a supporting substrate, such as a polyimide, as illustrated herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a cured poly(amic acid amideimide), a phosphate ester present in an amount of from about 0.1 to about 10 weight percent, a polysiloxane, and a conductive component and wherein said phosphate ester is selected from the group consisting of a tridecyl alcohol ethoxylate phosphate, a polyethylene glycol monotridecyl ether phosphate, and a nonylphenol ethoxylate phosphate.

2. The intermediate transfer member in accordance with claim 1 wherein said poly(amic acid amideimide) is a poly(amic acid-co-amideimide) with a number average molecular weight of from about 2,000 to about 100,000, and weight average molecular weight of from about 4,000 to about 200,000 as determined by GPC analysis.

3. The intermediate transfer member in accordance with claim 1 wherein said poly(amic acid amideimide) is represented by the following formulas/structures

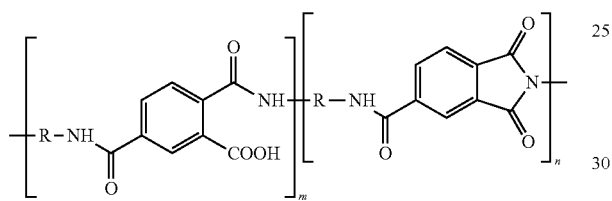

where m and n independently represent the number of repeating segments in the polymer chain, and each R is independently an aryl group.

4. The intermediate transfer member in accordance with claim 3 wherein n is from about 20 to about 1,000, m is from about 20 to about 1,000, and R is an aryl group containing from about 6 to about 36 carbon atoms.

5. The intermediate transfer member in accordance with claim 3 wherein m is from about 325 to about 675, and n is from about 325 to about 675.

6. The intermediate transfer member in accordance with claim 3 wherein R is selected from the group consisting of those groups represented by the following formulas/structures

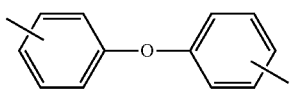

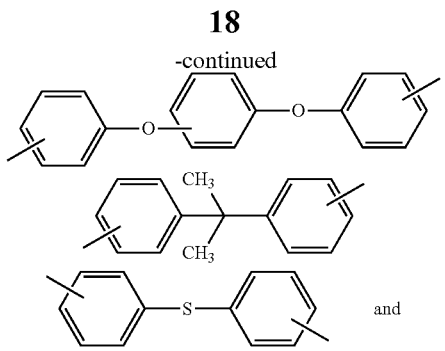

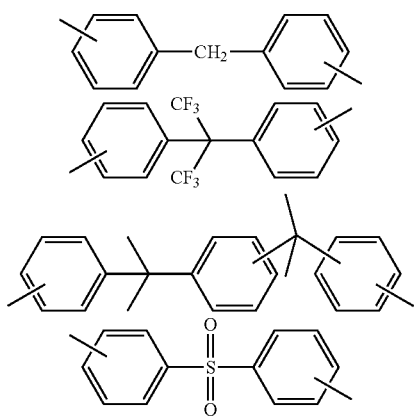

and mixtures thereof.

7. The intermediate transfer member in accordance with claim 1 wherein said poly(amic acid amideimide) is a copolymer as represented by the following formulas/structures

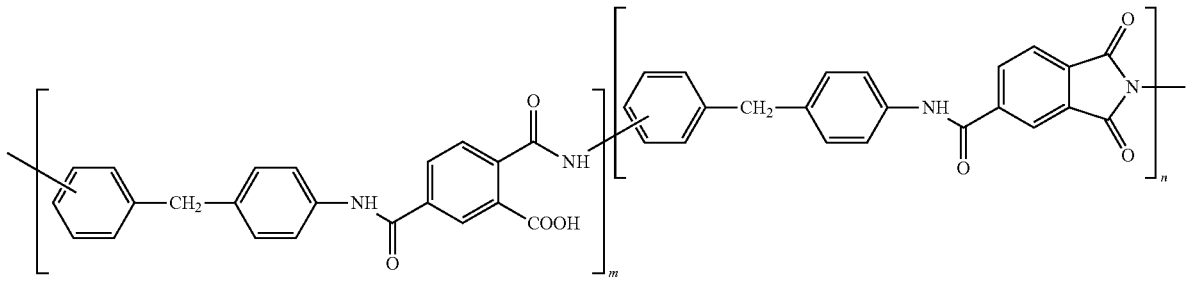

wherein m and n independently represent the number of repeating segments.

8. The intermediate transfer member in accordance with claim 7 where m is a number of from about 100 to about 1,000, and n is a number of from about 100 to about 1,000.

9. The intermediate transfer member in accordance with claim 1 wherein said polysiloxane is selected from the group consisting of a polyether modified polydimethylsiloxane, a polyester modified polydimethylsiloxane, a polyacrylate modified polydimethylsiloxane, and a polyester polyether modified polydimethylsiloxane.

10. The intermediate transfer member in accordance with claim 1 wherein said phosphate ester is a tridecyl alcohol ethoxylate phosphate.

11. The intermediate transfer member in accordance with claim 1 wherein said phosphate ester is a nonylphenol ethoxylate phosphate.

12. An intermediate transfer member consisting of a cured poly(amic acid amideimide), present in an amount of from about 70 to about 95 weight percent, a phosphate ester selected from the group consisting of a tridecyl alcohol ethoxylate phosphate, a polyethylene glycol monotridecyl ether phosphate, and a nonylphenol ethoxylate phosphate present in an amount of from about 0.5 to about 10 weight percent, a polysiloxane present in an amount of from about 0.01 weight percent to about 1 weight percent, a conductive filler present in an amount of from about 1 to about 30 weight percent and an additional polymer present in an amount of from about 1 to about 75 weight percent.

13. The intermediate transfer member in accordance with claim 12 with a break strength of from about 75 to about 95 Mega Pascals.

14. A xerographic intermediate transfer member consisting of a polymer layer of a cured mixture consisting of a poly(amic acid-co-amideimide) copolymer, a phosphate ester, a polydialkylsiloxane copolymer, and a conductive filler component, and wherein the poly(amic acid-co-amideimide) copolymer is encompassed by the following formulas/structures 15. The xerographic intermediate transfer member in accordance with claim 14 wherein m is a number of from about 275 to about 500, and n is a number of from about 275 to about 500.

16. The xerographic intermediate transfer member in accordance with claim 14 wherein the poly(amic acid-co-amideimide) copolymer has a number average molecular weight of from about 10,000 to about 50,000, and a weight average molecular of from about 20,000 to about 100,000 as determined by GPC analysis.

17. The xerographic intermediate transfer member in accordance with claim 14 wherein said phosphate ester is present in an amount of about 2 weight percent and is nonylphenol ethoxylate phosphate.

18. An intermediate transfer member consisting of a cured mixture of a poly(amic acid amideimide) copolymer, a phosphate ester, a polydialkylsiloxane, and a conductive carbon black component, which member possesses a break strength of from about 74 to about 98 Mega Pascals, and wherein the poly(amic acid-co-amideimide) copolymer is encompassed by the following formulas/structures

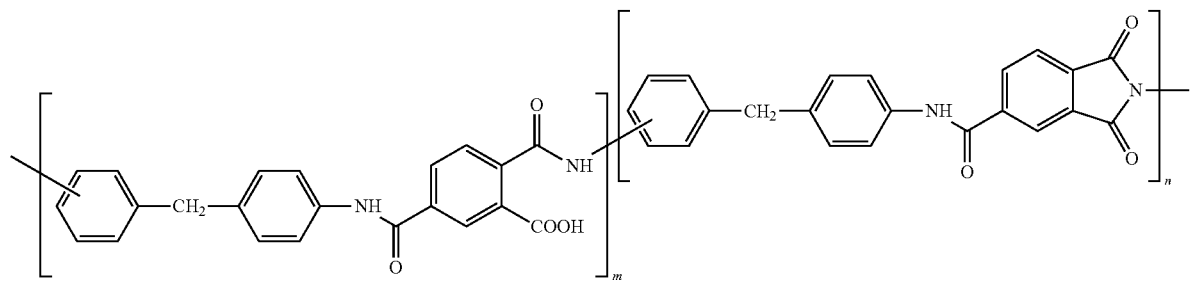

where m and n independently represent the number of repeating segments, where m is a number of from about 100 to about 1,000, and n is a number of from about 100 to about 1,000 and wherein said phosphate ester being present in an amount of

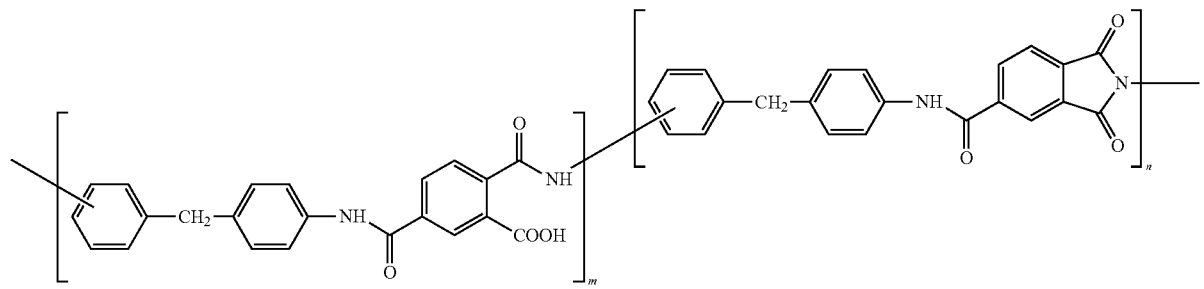

from about 0.1 to about 10 weight percent, and wherein said phosphate ester is selected from the group consisting of a tridecyl alcohol ethoxylate phosphate, a polyethylene glycol monotridecyl ether phosphate, and a nonylphenol ethoxylate phosphate.

wherein m is a number of from about 200 to about 400, and n is a number of from about 200 to about 400 and wherein said phosphate is selected from the group consisting of a tridecyl alcohol ethoxylate phosphate, a polyethylene glycol monotridecyl ether phosphate, and a nonylphenol ethoxylate phosphate.

19. The intermediate transfer member in accordance with claim 18 where said break strength is from about 80 to about 90 Mega Pascals and wherein said phosphate ester present in an amount of from about 1 to about 3 weight percent is nonylphenol ethoxylate phosphate.

* * * * *